E. A. G. Roulstone.
Window Screen.
No. 56,994. Patented Aug. 7, 1866.
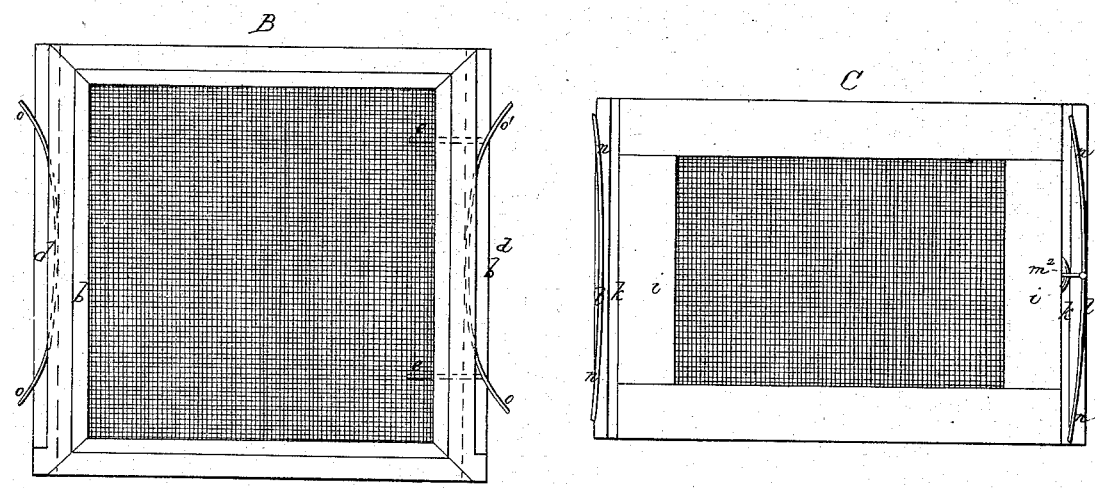
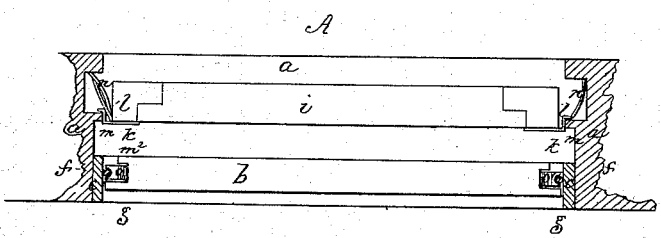
Witnesses:
Inventor:

UNITED STATES PATENT OFFICE.

E. A. G. ROULSTONE, OF ROXBURY, MASSACHUSETTS.

IMPROVED MOSQUITO-BAR.

Specification forming part of Letters Patent No. 56,994, dated August 7, 1866.

*To all whom it may concern:*

Be it known that I, E. A. G. ROULSTONE, of Roxbury, in the county of Norfolk and State of Massachusetts, have invented an Improved Mosquito-Bar for Windows; and I do hereby declare that the following, taken in connection with the drawings which accompany and form part of this specification, is a description of my invention sufficient to enable those skilled in the art to practice it.

The invention relates to a construction of mosquito guards or bars for windows, whereby, while they are rendered easy of insertion in the window-frames and of removal therefrom, they fit securely in place and in such manner as to effectually exclude mosquitoes and other insects from entrance.

The invention consists in applying to the sides of each bar, and in combination with edges or projections which fit against the sides of the window-frame, a spring or springs upon one or both sides thereof, and in so applying the spring upon one side that it may be thrown back from the inside of the bar to permit insertion of the same into the sash-frame or its withdrawal therefrom.

A in the drawings represents a plan of two bars, showing the manner of application either in front of the lower sash or under the upper one. B and C show rear elevations of the respective bars.

$a$ denotes the window-frame; $b$, the mosquito-bar. The front side of the bar is made of a width corresponding to the width between the face-beads $c$, and so as to fit between them; but in rear the frame is made narrower or cut away for attachment of semi-elliptical springs $o\ o'$, each being secured to the bar at its center by a screw, $d$.

From one spring, and at or near its ends, or between the center and the ends, two pins, $e$, project through the frame of the bar in front of the netting material, so that by drawing the pins inward the ends of the spring will be drawn into the depression or recess in the bar, the springs in their normal position projecting beyond the edges of the bar.

To apply the bar to the window, the side opposite the pins $e$ is pressed against the bead $c$ and the pins $e$ drawn back so as to allow the spring to pass by the inner surface of the bead. When the bar is so far introduced as to bring its upper side into contact with the lower bar of the raised inner sash, releasement of the pins causes the springs upon both sides to press against the faces of the opposite beads $c$, and thus hold the bar in position.

It will be obvious that a spring upon one side only may be made to retain the bar in position; but their application upon both sides is considered preferable. For the better securement of the bar, however, I prefer to apply a rod, $f$, to the face of one or both beads $c$, making each end of each spring with a notch, $g$, to slip over the rod, the bar being in this way protected from detachment by wind or other incidental circumstances. By extending these rods the whole length of the window-frame the bar may be used in connection with either the upper or lower sash, as will be readily understood.

Instead of the rods, recesses may be made in the faces of the beads, into which the ends of the springs may enter.

The bar may be slid upward on the rods, if desirable, to obtain access to the open window, or when the window is closed.

If the bar is to be applied under the upper sash, I modify the arrangement of the springs, as seen in the bar $i$. Each side of this bar has a plate, $k$, having a lip or flange, $l$, fitting against the upper edge and rear face of the parting-bead $m$, as seen at A. From each of these plates a spring, $n$, extends, the ends of each spring abutting against the frame-bead and holding the bar in position. From one spring a finger-piece, $m^2$, extends through to the front of the bar.

To remove the bar the side opposite to the finger-piece is first pressed back, which permits it to be pressed laterally into the recess made by the window-frame and the frame and parting-beads, so that by thus pressing upon the finger-piece $m^2$ its spring $n$ may be thrown out from the bead against which it impinges, allowing that side of the bar to be pressed back and the bar to be then drawn into the room, as will be readily understood.

I claim—

1. A mosquito-bar for windows, when constructed with a spring, $o$ or $n$, applied to one or both sides thereof to hold the bar in position with relation to the sash above or below it, in combination with projecting edges or flanges to fit against the window-beads $c$ or $m$, all substantially as set forth.

2. In combination with a bar made with these projecting edges and springs, as set forth, so applying one of the springs $n$ or $o'$ that it may be operated from within the bar to insert or remove the bar, substantially as set forth.

3. In combination with a bar so constructed with springs $o$ $o'$ and with a window-sash, the employment of the vertical rods $f$, for the better securement of the bar, and to enable it to be raised from and lowered into position, substantially as described.

E. A. G. ROULSTONE.

Witnesses:
F. GOULD,
S. B. KIDDER.